*INVENTOR.*
FRANK PUTZ

BY Lee H. Kaiser

*ATTORNEY*

Oct. 20, 1959  F. PUTZ  2,909,073
SPEED RESPONSIVE CLUTCH
Filed April 21, 1958  4 Sheets-Sheet 2

INVENTOR.
FRANK PUTZ
BY Lee H. Kaiser
ATTORNEY

*INVENTOR.*
FRANK PUTZ

BY *Lee H Kaiser*

*ATTORNEY*

Oct. 20, 1959  F. PUTZ  2,909,073
SPEED RESPONSIVE CLUTCH
Filed April 21, 1958  4 Sheets-Sheet 4

INVENTOR.
FRANK PUTZ
BY Lee H Kaiser
ATTORNEY

United States Patent Office 2,909,073
Patented Oct. 20, 1959

2,909,073
SPEED RESPONSIVE CLUTCH

Frank Putz, Wauwatosa, Wis.

Application April 21, 1958, Serial No. 729,797

7 Claims. (Cl. 74—230.17)

This invention relates to speed responsive clutches.

This application is a continuation-in-part of my application Serial No. 503,671, entitled "Speed Responsive Clutch," filed April 25, 1955, now U.S. Patent 2,851,893.

In many commercially available speed responsive clutches, the members responsive to centrifugal force are wedged in position solely by centrifugal force to drivingly connect the driving and driven members, and these centrifugally responsive members release when the centrifugal force diminishes below a predetermined value. Consequently, the speed at which such a clutch disengages is almost as high as the speed at which the clutch engages, and the driven member is often undesirably released during low operating speeds.

It is an object of the invention to provide an improved speed responsive clutch which is simple in construction and inexpensive to manufacture.

It is a further object of the invention to provide a speed responsive clutch wherein the speed of disengagement is considerably lower than the speed of engagement.

A still further object of the invention is to provide a speed responsive clutch wherein the resistance offered by the driven member and the load is utilized to increase the horsepower capacity of the clutch.

Another object of the invention is to provide such a clutch with centrifugally responsive members and having novel means tending to hold said members in their engaged, or driving, position.

It is a further object of the invention to provide such a speed responsive clutch having means to interlock the centrifugally responsive members and prevent their independent movement between engaged and disengaged positions.

Still another object of the invention is to provide a speed responsive clutch which utilizes a mechanical advantage to multiply the forces acting on the centrifugally responsive members into greater gripping power against the driven member.

A still further object of the invention is to provide a speed responsive clutch having means to prevent eccentric motion of the centrifugal members, whereby chattering and vibration of the clutch is minimized and engagement with the driven member is smooth, uniform, and positive.

An object of one embodiment of the invention is to provide a speed responsive clutch wherein the centrifugally responsive members directly engage a driven belt which is utilized as the friction material. It is a further object of this embodiment of the invention to provide a speed responsive clutch including an integral first half-sheave facing a second half-sheave formed jointly by the centrifugal members and adapted to engage a V-belt between the first and second half-sheaves when the centrifugal members move outward. It is an object of an alternative embodiment of the invention to provide such a clutch having means to advance the centrifugal members a substantially greater distance in a direction to "close" the V between said half-sheaves than would result if the centrifugally responsive members moved directly in a radial direction. It is a further object of this embodiment of the invention to provide a speed responsive clutch for driving a V-belt wherein the horsepower capacity of the clutch remains at or near maximum regardless of considerable variation in belt tension. It is also an object of this embodiment of the invention to provide a speed responsive clutch having means to cam the centrifugal members axially of the driving member and at an acute angle to the axis of rotation and thus amplify the effective movement of the centrifugal members toward the driven member, augment the gripping pressure against the driven member, and increase the horsepower capacity of the clutch.

A still further object of the invention is to provide a speed responsive clutch wherein the driving member is provided with surfaces for camming the centrifugal members outward which cooperate with the driven element to increase the gripping pressure with which the centrifugal members engage the driven element beyond that resulting from centrifugal force.

In a preferred form, the invention is adapted to provide a driving connection between a belt and rotatable shaft driven from a power source, and may thus be termed a centrifugal pulley, whereas in alternative embodiments the centrifugally responsive members directly engage a rotatable driven member.

For a better understanding of the principles and objects of the invention, reference should be had to the following detailed description taken in conjunction with the accompanying drawing wherein.

In a preferred embodiment of the invention illustrated in Figs. 1–5, a unitary driving disc, or half-sheave, 10 having a frusto-conical, belt engaging surface 11 on the inner face near the outer margin thereof is provided with an axial bore 12 having a keyway slot 14 in the inner periphery thereof adapted to receive a key 15 and thus permit keying the disc 10 to a rotatable shaft 16 extending through the axial bore 12 and operatively connected to a suitable drive means (not shown).

Figures 1, 3:
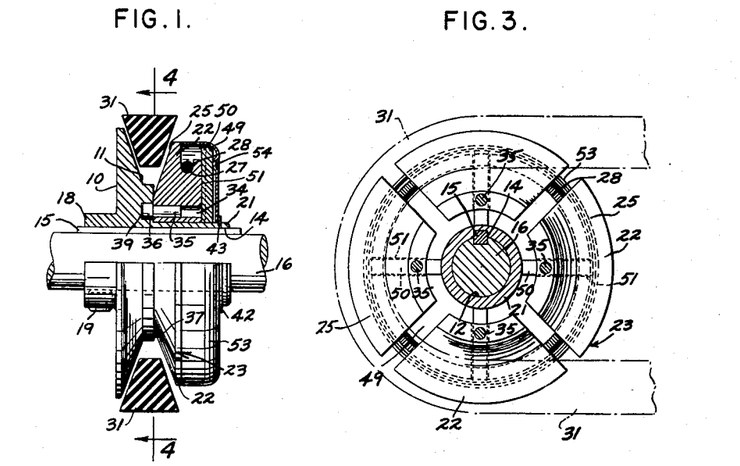
Fig. 1 is an elevation view, partly in section, through a preferred embodiment of the invention with the centrifugally responsive members in their radially inward, or disengaged position.
Fig. 3 is a sectional view taken on line 3—3 of Fig. 2.
Figures 2, 4, 5:
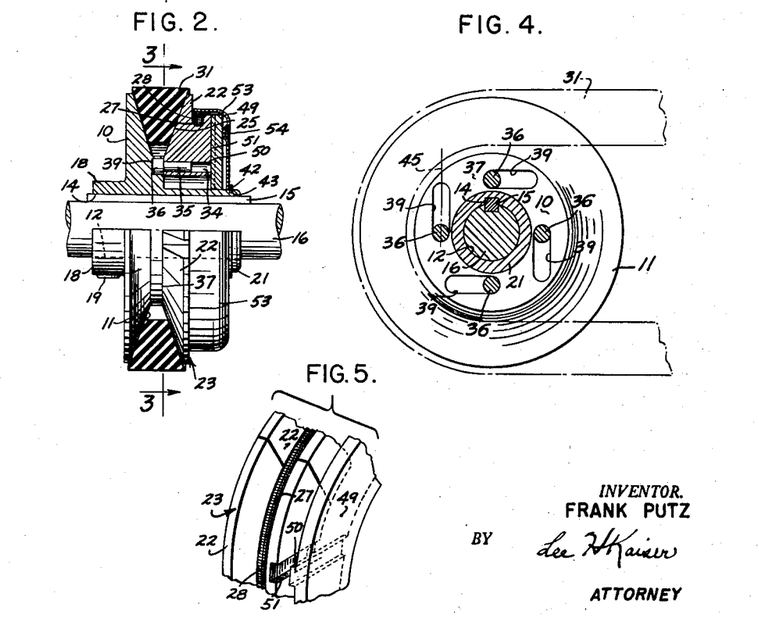
Fig. 2 is a view similar to Fig. 1 but with the centrifugally responsive members in their radially outward position wherein they are adapted to frictionally engage a belt.
Fig. 4 is a sectional view taken on line 4—4 of Fig. 1.
Fig. 5 is an auxiliary view in perspective showing the means for interlocking and preventing independent movement of the centrifugally responsive members.

The driving disc 10 forms half of a sheave, or half of a pulley wheel. A radial aperture in a hub 18 extending to the left of driving disc 10 as seen in Figs. 1 and 2 is threaded to receive a set screw 19 to provide alternative means of engaging the driving disc 10 with the drive shaft 16. A hub 21 extends from the disc 10 on the side opposite the hub 18.

As best seen in Fig. 3, a plurality of centrifugally responsive segments 22 circumjacent the hub 21 jointly form a multi-segmented disc 23, or half pulley wheel, opposite the unitary driving disc 10. Four centrifugally responsive segments 22 are illustrated in the preferred embodiment of the invention, but it will be appreciated that any desired number of centrifugal segments 22 may be utilized. A frusto-conical belt-engaging surface 25 is provided near the outer margin of the multi-segmented disc 23 jointly formed by the centrifugal segments 22, the belt-engaging surface 25 being opposite the belt-engaging frusto-conical surface 11 on the driving disc 10 when the segments 22 are in their radially outward, or engaged, position as shown in Fig. 3. Peripheral grooves 27 in each of the centrifugal segments 22 jointly form a circumferential groove adapted to receive a tension spring, or garter spring 28, which normally resiliently retains the segments 22 in their radially inward, or disengaged, position against the hub 21.

In the normal, or radially inward, position of segments 22, the radial sides of segments 22 are contiguous as seen in Fig. 5, and as seen in Fig. 1 the multi-segmented disc 23 formed jointly by the segments 22 is of smaller diameter than the disc 10 and the frusto-conical surface 25 thereon is free of a belt 31 disposed between the unitary disc 10 and the multi-segmented disc 23.

A plurality of means are provided for drivingly connecting each of the centrifugally responsive members 22 with the driving member 10 and for moving the centrifugally responsive members 22 circumferentially relative to the driving member. Each of said means includes a camming surface on the driving member 10 and the centrifugally responsive members 22 have portions radially outward from and adapted to move along said camming surface as said centrifugally responsive members 22 move between their radially inward and radially outward positions. In the embodiments of Figs. 1–5 the camming surface of the means for drivingly connecting the driving member 10 and each of the centrifugally responsive members 22 includes an elongated recess 39 in the driving member 10 adapted to slidably receive a projection in the form of a pin 35 carried by the centrifugally responsive member 22. Each centrifugally responsive segment 22 is provided with an aperture 34 which receives the shank of the pin 35 which has a headed portion 36 extending parallel to the axis of shaft 16. It will be appreciated that the pin 35 can take the form of a stud integral with and extending from segment 22, and it is intended by the word "carried" in the appended claims to cover both the construction wherein the pin is integral with the centrifugally responsive member and the arrangement where the pin is releasably affixed within said member. As best seen in Fig. 4 the annular surface 37 on the inner face of unitary disc 10 between hub 21 and frusto-conical surface 11 is provided with a plurality of peripherally spaced apart, elongated recesses 39, equal in number to the centrifugally responsive segments 22. Each recess 39 slidably and rotatably receives one of the pins 35. The camming surface of the means for drivingly connecting the driving member 10 and each of the centrifugally responsive segments 22 and for moving the segments 22 circumferentially relative to driving member 10 and opposite to the direction of rotation thereof is provided by the radially inward wall of each of the elongated recesses 39 as explained hereinafter. Normally the spring 28 resiliently urges the centrifugally responsive segments 22 to a position wherein each pin 35 is in the radially inward end of the recesses 39. A retaining ring 42 within a circumferential groove 43 in the hub 21 prevents movement of centrifugal segments 22 in a direction axially away from the unitary driving disc 10.

Figure 11:
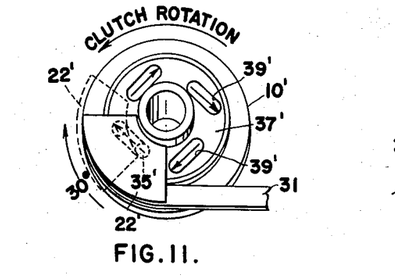
Fig. 11 is a schematic view illustrating that the centrifugal members move circumferentially counter to the direction of clutch rotation in going between engaged and disengaged positions.

The centrifugally responsive segments 22 are adapted in response to a predetermined rotational velocity to move outward to an engaged position wherein the pins 35 are in the radially outward end of the recesses 39 as shown in Figs. 2 and 3. This movement of a single centrifugal segment 22 is illustrated in Fig. 11 from the radially inward position shown in full lines to the radially outward shown in dotted lines. When the centrifugal segments 22 are in the radially outward position, the diameter of multi-segmented disc 23 is equal to that of driving disc 10 and the frusto-conical belt engaging surface 25 frictionally engages belt 31, the approximate position of the belt 31 being schematically represented by dash-dot lines in Fig. 3.

Figure 12:
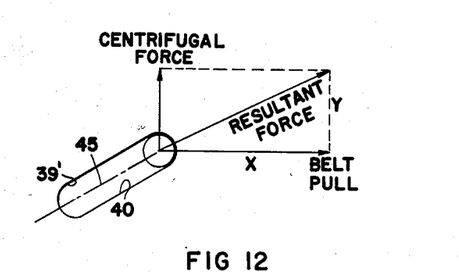
Fig. 12 is a view schematically illustrating the forces which tend to retain the centrifugally responsive members in engaged position.

As the centrifugally responsive members 22 move radially outward under the influence of centrifugal force, the pins 35 move up the inclined recesses 39 in the direction of the arrows shown in Fig. 11, thereby causing the multi-segmented disc 23 formed jointly by the segments 22 to rotate relative to the driving disc 10 and counter to the direction of clutch rotation as illustrated in Fig. 11. The reaction or pull of the driven element, i.e. V-belt 31, on the centrifugal segments 22 is in a direction to keep the pins 35 in the outer end of the recesses 39. The radially innermost wall 40 of each recess 39 forms a camming surface inclined to the radius and having a first portion thereof adjacent the outer end of recess 39 further removed in a radial direction from the axis of rotation than a second portion adjacent the inner end of recess 39. The radially outward end of each recess 39 is circumferentially spaced from the inner end thereof in a direction opposite to the direction of rotation of driving member 10, and the angle of the camming surface 40 provides the same mechanical advantage x/y (see Fig. 12) as an inclined plane and multiplies the centrifugal force and belt pull acting on the belt 31 into greater gripping power against the belt 31. Radially inward forces due to belt pressure and spring tension have only a minor component in a direction down the recesses 39 and are exerted principally against the radially innermost sidewall 40 of the groove 39. The reaction of the driven V-belt 31 thus tends to keep the centrifugal members 22 in their expanded position with the pins 35 on the radially outermost portion of camming surface 40 until the speed falls below the predetermined disengaging speed which is considerably lower than the engaging speed. The camming surface 40 acting against the pins 35 urges the centrifugal members 22 against the driven V-belt 31 and thus cooperates with the driven member 31 to increase the gripping pressure with which the centrifugal members 22 engage the driven member 31 beyond that resulting from centrifugal force.

Figure 9:
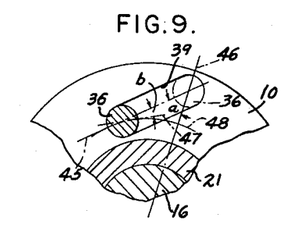
Fig. 9 is an auxiliary view schematically illustrating the direction in which the forces are directed in the means for increasing the gripping pressure of the centrifugal members against the driven element.

As best seen in Fig. 9 the elongated recesses 39 are so inclined that tangentially directed forces acting on segments 22 have a maximum component along the longitudinal axis 45 of the recesses 39 whereas radially directed forces have a minimum component in the direction of said longitudinal axis 45. As a consequence of this inclination of the camming surface 40 of the elongated recesses 39, tangentially directed forces, for example, due to the moment exerted by driving disc 10 tending to rotate the multi-segmented disc 23 about the axis of shaft 16 and due to frictional drag of belt 31 on segments 22, are exerted principally along the longitudinal axis 45 and cause the segments 22 to move the pins 35 to the first portion of camming surface 40 adjacent the radially outward end of the recesses 39, whereas radially inward directed forces due to tension in belt 31 and in spring 28 tending to cause the centrifugal segments 22 to move the pins 35 to the second portion of camming surface 40 adjacent the radially inward end of recesses 39, and thus disengage the clutch, are exerted mainly against the camming surface 40 of the recesses 39 and have only a minimum component in the direction of the longitudinal axis 45. Consequently, a mechanical advantage of considerable magnitude is provided tending to restrain the segments 22 in their engaged position wherein the pins 35 are in the radially outward end of recesses 39, and the clutch of the invention greatly resists any tendency to release due to belt tension. Further, the segments 22 positively disengage at a predetermined release speed and the difference between speeds of engagement and release is considerably higher than in prior art devices.

To provide a substantial mechanical advantage for increasing the pressure with which the segments 22 engage the V-belt 31 and for holding the centrifugal segments 22 in their engaged position with the pins 35 in the radially outward end of the recesses 39, the longitudinal axis of each recess 39 is preferably at an angle "$a$" (see Fig. 9) of greater than sixty degrees with the radius 46 intersecting the pin 35 at the radially outward end of recess 39. As a consequence of this inclination of recess 39, the angle "$b$" between the longitudinal axis 45 and the tangent 47 to a circle 48 concentric with disc 10 and intersecting the pin 35 in the radially inward end of recess 39 at the point where said circle 48 intersects pin 35 is less than thirty degrees, any tangentially directed force due to frictional drag of belt 31 tending to move a centrifugal segment 22 in the opposite direction from which unitary disc 10 is turning has a component equal to at least $\cos b = 0.866$ in the direction of the longitudinal axis 45 tending to move pin 35 to the first portion of camming surface 40 adjacent the radially outward end of recess 39, whereas radially inward directed forces due to belt tension exerted against segments 22 have a component which is always less than $\cos a = 0.500$ tending to move pin 35 along the longitudinal axis 45 of the recess 39. As shown in Fig. 4 the longitudinal axis 45 has an inclination of ninety degrees to the radius intersecting pin 35 at the radially inward end of the recess 39, i.e. angle $b = 0$ degrees, and substantially all of the available tangentially directed forces acting on centrifugal segments 22 are directed along longitudinal axis 45 tending to move pin 35 to the first portion of camming surface 40 adjacent the radially outward end of recess 39, whereas radially inward directed forces acting upon segments 22 and tending to move pins 35 from the first portion of camming surface adjacent the radially outward end of recess 39 to the second portion of camming surface 40 adjacent radially inward end of the recesses 39 have a minimum component in the direction of the recesses.

In the embodiments illustrated in Figs. 1–10 it is assumed that the clutch can only operate in one direction and this embodiment is illustrated with the radially outward portion of the camming surface 40 spaced circumferentially from the radially inward portion thereof in a direction opposite to the direction of rotation of the driving member. However, it will be apparent that the clutch will be reversible if two sets (not shown) of elongated recesses are provided with the two recesses in register at the radially inward end thereof, and said recesses are inclined at opposite angles to the radius through the point where the recesses register, thereby forming Y-shaped, or heart-shaped, recesses having camming surfaces for both directions of rotation of the clutch. In the embodiments illustrated in Figs. 1–10, projections, or pins, 35 carried by the centrifugal members are slidably along the camming surfaces 40 when the centrifugal members 22 move between inner and and outer positions, but in alternative forms of the invention such as the embodiment illustrated in Figs. 16–20, the centrifugal members engage the camming surface 40 directly.

Means are provided to permit movement of segments 22, relative to a common rotatable interlocking member only in planes coincident with axis of rotation of the driving member 10, thus interlocking and preventing independent movement of the segments 22. In the embodiment of Figs. 1–10 the centrifugal segments 22 can only move radially relative to the interlocking member, and as best seen in Fig. 5, a circular interlocking plate 49 circumjacent hub 21 between the multi-segmented disc 23 and the retaining ring 42 is provided with a plurality of peripherally spaced apart, radially extending, elongated projections 50 on the face thereof opposite the multi-segmented disc 23. Each centrifugal segment 22 is provided on the face away from driving member 10 with an elongated radially extending groove 51 which slidably receives a projection 50 on the circular plate 49. The cooperating projections 50 and grooves 51 provide interengaging means between the rotatable interlocking member 50 and the centrifugal members 22 which permit only radial movement of segments 22 relative to the interlocking member and causes the segments 22 and interlocking plate 49 to shift as a unit circumferentially relative to driving member 10 as the pins 35 slide over the camming surfaces 40 within the recesses 39 when segments 22 move from one end of the recesses 39 to the other. As illustrated in Fig. 11, when the centrifugally responsive members 22 move outward, the multi-segmented disc 23 rotates counter to the direction of clutch rotation. The centrifugally responsive members 22 move simultaneously outward and tangentially. This combined radial guiding action provided by projections 50 sliding within grooves 51 and tangential movement interlocks the centrifugally responsive members so they can only move together, thereby positively preventing independent action of the segments 22. It will be apparent that independent movement of segments 22 is prevented by this construction and that the segments can only move simultaneously between radially inner and outer positions. As a consequence, eccentric rotational movement of the individual segments 22 is prevented, vibration and chattering of the speed responsive clutch of the invention is minimized, grabbing of the driven member, i.e. belt 31, is eliminated, and engagement of the driven member is uniform, smooth, and positive.

A cup-shaped cover 53 circumjacent the hub 21 between the interlocking plate 49 and the retaining ring 42 prevents accumulation of dirt, moisture, or grease on or between the centrifugal segments 22, the spring 28, or the interlocking plate 49 which might interfere with the smooth operation of the clutch. The cover 53 is preferably of resilient metallic material, for example, mild steel, and an annular embossing 54 formed therein bears against the circular plate 49. The cover 53 thus acts as a resilient washer tending to urge the plate 49 against the multi-segmented disc 23 and the segments 22 against the driving disc 10.

It will be appreciated that if a narrower clutch is desired, the circular interlocking plate 49 may be omitted and the radially extending elongated projections 50 formed directly in the cover 53.

Figure 6:
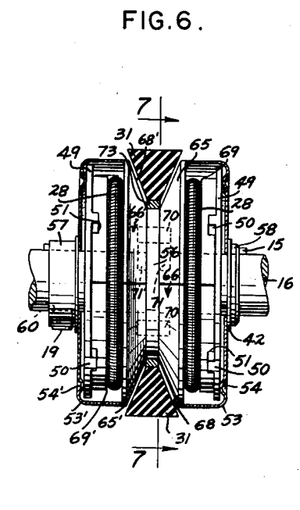
Fig. 6 is an elevation view, partly in section, of an alternative embodiment of the invention.
Figure 7:
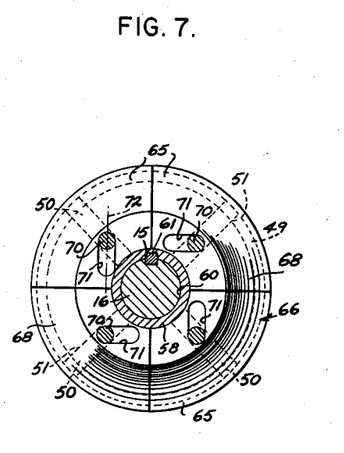
Fig. 7 is a sectional view taken on line 7—7 of Fig. 6.

In an alternative embodiment of the invention shown in Figs. 6 and 7, two sets of centrifugally responsive segments jointly form a sheave and are adapted in response to a predetermined rotational velocity to simultaneously move outward and frictionally engage and drive a belt disposed therebetween. A driving disc 56 having hubs 57 and 58 on opposite sides thereof is provided with an axial bore 60 having a keyway slot 61 in the inner periphery thereof adapted to receive a key 15 for keying the driving disc 56 to a rotatable shaft 16 extending through the axial bore 60 and operatively connected to suitable drive means (not shown). A radial aperture in the hub 57 is threaded to receive a set screw 19 to provide alternative means for engaging the driving disc 56 with the rotatable shaft 16. A plurality of centrifugally responsive segments 65 jointly form a multi-segmented disc, or half pulley wheel, 66 circumjacent the hub 58 and having a frusto-conical belt engaging surface 68 near the outer margin thereof. Similarly a plurality of centrifugally responsive segments 65' jointly form a multi-segmented disc 66', or half pulley wheel, 66' circumjacent the hub 57 and having a conical belt engaging surface 68' opposite the conical surface 68. The multi-segmented discs 66 and 66' are complementary and only disc 66 will be described, the elements of multi-segmented disc 66' being given the same reference numerals as the parts of multi-segmented disc 66 to which they are similar with the addition of the prime ( ' ) designation. Peripheral grooves 69 in each of the segments 65 jointly form a circumferential groove adapted to receive a tension spring, or garter spring, 28 which resiliently retains the segments 65 in their radially inward position. A retaining ring 42 within a circumferential groove in the hub 58 prevents movement of the segments 65 in a direction axially away from the driving disc 56.

In the embodiment of Figs. 1 through 5 the means for drivingly connecting the driving member and the centrifugally responsive segments and for moving segments circumferentially relative to the driving member as they move between inner and outer positions includes elongated recesses 39 in the driving member 10 slidably and rotatably receiving projections or pins 35 carried by the centrifugally responsive segments 22. The driving connection between driving member 10 and centrifugal segments 22, the circumferential movement of centrifugal members 22, and the mechanical advantage of the invention are obtained regardless of whether the camming surfaces provided by the elongated recesses are in the driving member or in the centrifugally responsive members, and in the embodiment of Figs. 6 and 7 a plurality of pins 70 equal in number to the segments 65 (and to the segments 65') extend through and protrude on both sides of the driving member 56 parallel to the axis of shaft 16. An elongated recess 71 provided in each centrifugally responsive segment 65 slidably and rotatably receives one protruding end of a pin 70, and similar elongated recesses 71' in the centrifugally responsive segments 65' slidably receive the opposite protruding end of the pins 70. The tension spring 28 normally resiliently retains the segments 65 in a position wherein the ends of the pins 70 are in the radially outward end of the recesses 71. The elongated recesses 71 are inclined at angles similar to the recesses 39 of the embodiment of Figs. 1 through 5.

Tangentially directed forces acting on a centrifugal segment 65 due to the turning moment exerted by disc 56 and transmitted through pin 70 against a wall defining a recess 71, or due to frictional drag of belt 31 on a segment 65, tending to move the centrifugal segment relative to the driving disc 56, have a maximum component in the direction of the longitudinal axis 72, thereby causing the segments 65 and 65' to move outward until the pins 70 are in the radially inward end of the recesses 71 and 71' and the frusto-conical belt engaging surfaces 68 and 68' frictionally engage opposite sides of a belt 31 disposed between the multi-segmented discs 66 and 66'. In a manner similar to the preferred embodiment, radially inwardly directed forces acting on a segment 65 due to tension on belt 31 and tension in spring 28 are principally exerted in urging the wall of a recess 71 against a pin 70 and have only minimum component in a direction along the longitudinal axis 72. Consequently, the unique tendency to restrain the segments in their engaged position, the low disengagement speed, and the wide spread between speeds of clutch operation and release provided in the embodiment of Figs. 1–5 are also attained in the embodiment of Figs. 6 and 7.

Means identical to the embodiment of Figs. 1–5 are provided to interlock segments 65 and prevent independent movement thereof between disengaged and engaged positions. A circular interlocking plate 49 circumjacent the hub 58 between the multi-segmented disc 66 and the retaining ring 42 has a plurality of peripherally spaced apart, radially extending, elongated projections 50 thereon. Each segment 65 is provided with an elongated radially extending groove 51 which slidably receives one of the projections 50, and the cooperating grooves 51 and projections 50 provide interengaging means between interlocking member 49 and centrifugal members 65 which permit only radial movement of segments 65 relative to interlocking plate 49, thereby causing the interlocking plate 49 and the segments 65 to shift as a unit circumferentially relative to the driving member 56 as the segments move radially to cause the walls of the recesses 71 to slide along the pins 70. As a consequence of this construction, eccentric rotation of segments 65 is prevented, vibration and chattering of the clutch is eliminated, and the engagement of the centrifugally responsive segments 65 and 65' with belt 31 is smooth, positive, and uniform. In a manner identical to the preferred embodiment, a cup-shaped cover 53 of resilient metallic material circumjacent the hub 58 between the multi-segmented disc 66 and the retaining ring 42 is provided with an annular embossing 54 which bears against the circular interlocking plate 49, and the cover 54 acts as a resilient washer urging the circular interlocking plate 49 against the multi-segmented disc 66 and the segments 65 against the driving disc 56 and aids in eliminating chatter of segments 65.

In the embodiment of Figs. 6 and 7 an idler ring 73, preferably of material such as nylon or a self lubricating bronze bearing material commercially available under the trademark "Oilite" having excellent wearing qualities and providing a smooth bearing surface, rotates freely about driving disc 56 and normally permits a belt 31 to turn freely about its true center free of the centrifugally responsive segments 65 and 65' until the driving disc 56 is rotated at sufficiently high velocity to cause the segments 65 and 65' to simultaneously move outward and frictionally engage the frusto-conical surfaces 68 and 68' with the belt 31.

It will be apparent that the idler ring 73 may also be incorporated in the preferred embodiment shown in Figs. 1 through 5.

Figure 8:
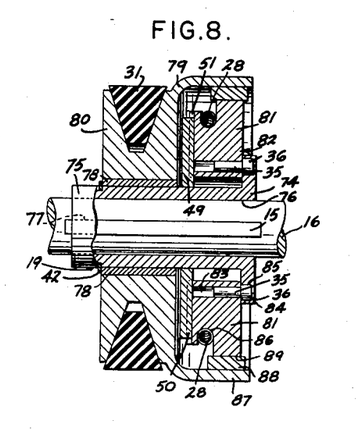
Fig. 8 is a sectional view taken through the axis of still another alternative embodiment of the invention wherein the centrifugally responsive members are adapted to directly engage a rotatable driven member.

In the alternative embodiment of the invention illustrated in Fig. 8 the centrifugally responsive members directly engage the member to be rotatably driven rather than a belt. A circumferentially flanged driving member 74 having a hub 75 is provided with an axial bore 76 having a keyway slot 77 in the inner periphery thereof adapted to receive a key 15 to permit keying the driving member 74 to a rotatable shaft 16 extending through the axial bore 76 and operatively connected to suitable drive means (not shown). A radial aperture in the hub 75 is threaded to receive a set screw 19 to provide alternative means to operatively engage driving member 74 with shaft 16.

A circumferential bearing 78 circumjacent the hub 75 rotatably journals a drum 79 having a sheave 80 integral therewith adapted to receive and drive a belt 31. A plurality of centrifugally responsive segments 81 jointly forms a multi-segmented disc 82 circumjacent the hub 75. Each segment 81 is provided with an aperture 83 which receives the shank of a pin 35 having a headed portion 36 extending parallel to the axis of shaft 16. The face of the circumferential flange 84 of the driving member 74 opposite the multi-segmented disc 82 is provided with a plurality of peripherally spaced apart, elongated recesses 85 each of which slidably receives the headed portion 36 of one of the pins 35. The elongated recesses 85 are inclined at angles similar to those of the recesses 39 in the driving disc 10 of the embodiment of Figs. 1–5. The centrifugally responsive segments 81 are provided with peripheral grooves 86 which jointly form a circumferential groove adapted to receive a tension spring 28 which resiliently urges the segments 81 to a normal disengaged position wherein the pins 35 are in the radially inward end of the elongated recesses 85. Although the embodiment of Fig. 8 is illustrated as having the drum 79 driving a belt, it will be appreciated that any rotatable member may be driven by the drum 79.

The drum 79 is provided with a rim 87 extending parallel to the axis of shaft 16 and disposed radially outward from the centrifugal segments 81. A peripheral band 88 of material having a coefficient of friction and heat dissipating properties suitable for a friction clutch, for example asbestos fabric, is provided in the inner periphery of the rim 87. A clutching surface 89 is provided on the outer periphery of each centrifugally responsive segment 81. The spring 28 normally retains the centrifugal segments 81 in a position wherein the pins 35 are in the radially inward end of the recesses 85 and the frictional clutching surfaces 89 are free of the peripheral band 88.

A circular interlocking plate 49 circumjacent hub 75 between multi-segmented disc 82 and the drum 79 is provided with a plurality of radially extending elongated projections 50 in a manner similar to interlocking plate 49 of the preferred embodiment, and each segment 81 is provided with a radially extending elongated groove 51 which slidably receives one of the projections 50. The elongated projections 50 and grooves 51 cooperate to permit only radial movement of segments 81 relative to the interlocking plate 49 in a manner similar to the embodiment of Figs. 1–5. A circumferential groove in the hub 75 receives a retaining ring 42 which prevents movement of drum 79 in a direction axially away from the segments 81.

The segments 81 are adapted in response to a predetermined rotational velocity to move to a radially outward, or engaged, position shown in Fig. 8 wherein the pins 35 are in the radially outward end of the recesses 85 and the clutching surfaces 89 are in driving engagement with the peripheral band 88 on driven drum 79. Tangentially directed forces acting on segments 81 have a maximum component in the direction of the longitudinal axis of elongated recesses 85 in a manner identical to the preferred embodiment, and the same mechanical advantage is provided tending to resist radially inward directed forces acting on the segments 81 and to increase the gripping pressure with which the centrifugal segments engage peripheral band 88 beyond that resulting from centrifugal force as in the Figs. 1–5 embodiment and to effectively restrain the segments 81 in engaged position.

Figure 10:
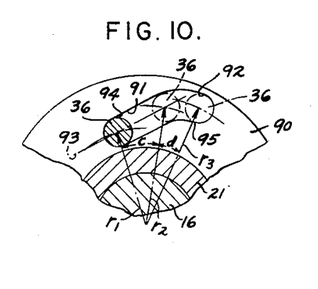
Fig. 10 is a partial view taken through an embodiment of the invention wherein a greater differential is provided between the speed of engagement and release.

Fig. 10 is a partial sectional view through an alternative embodiment wherein the difference between the speeds of clutch engagement and release is greater than in the preferred embodiment and is illustrative of the many different characteristics that can be obtained by changing the shape of the elongated recesses. With the exception of the driving member 90, all the clutch components are identical to the embodiment of Figs. 1 through 5. The driving member 90 is similar to the driving disc 10 except that the elongated recesses 91 provided therein include a hook portion 92 at the radially outward end thereof. The longitudinal axis 93 of the straight portion 94 of each recess 91 is inclined at an angle similar to the longitudinal axis 45 of the preferred embodiment and the hook portion 92 is so constructed that the radially inner wall 95 thereof is substantially tangentially directed and so that radial directed forces acting upon the segments are substantially directed against the tangential wall 95 and thus have a negligible component in a direction to move the pins 35 to the radially inward end of recesses 91. It will be appreciated that a maximum mechanical advantage is provided in the embodiment of Fig. 10 tending to lock the segments in their engaged, or radially outward, position.

In order to insure that the centrifugal segments positively release at a predetermined speed, it is desirable that the hook portion 92 be so constructed that the radius $r_3$ of a circle intersecting the headed portion 36 of the pin 35 in the radially outward end of recess 91 is greater than the radius $r_2$ of a circle intersecting the headed portion 36 at the point where the straight portion 94 of the recess 91 ends and the hook portion 92 begins. However, in order to provide the desired tendency to restrain the centrifugal members against inward movement when pins 35 are within hook portion 92 (as contrasted with radial outward movement of the segments which is desired in the straight portion 94 of the recesses 91) it is desirable that the difference between $r_3$ and $r_2$ for a given angular displacement "$d$" of the segment relative to the driving member, i.e., the ratio $$\frac{r_3 - r_2}{\angle d}$$

be considerably smaller than a similar ratio for the straight portion 94 of the recess 91, i.e. smaller than the difference between radius $r_2$ and radius $r_1$ at the radially inward end of the recess 91 for a given angular displacement $c$ of headed portion 36 of pin 35

$$\left(\text{in other words, smaller than } \frac{r_2 - r_1}{\angle c}\right)$$

A small ratio of $$\frac{\Delta r}{\angle}$$

means that a relatively small radial movement of the segments is obtained for a given angular shift of the segments relative to the driving member 90, and consequently that an effective action restraining the centrifugal segments in their outer position is obtained.

In the preferred embodiment wherein the elongated recesses are illustrated as being rectilinear, the centrifugally responsive segments initially move only slightly in a radial direction for each degree of angular shift of the segments relative to the driving member, but move radially outward at an increasing rate for each degree of such angular shift as the pins approach the radially outward end of the recesses. It will be appreciated that the elongated recesses can be curved as desired to provide uniform movement in a radial direction for each degree of angular shift of the segments relative to the driving member, and it is intended in the appended claims that "longitudinal axis" covers not only the axis of a rectilinear recess but also the general direction of a curved or arcuate recess. Further, the speeds of engagement and disengagement of the centrifugal clutch of the invention can be changed as desired by varying the tension of the garter spring, the weight of the centrifugally responsive segments, or the shape or inclination of the elongated recesses.

Figure 13:
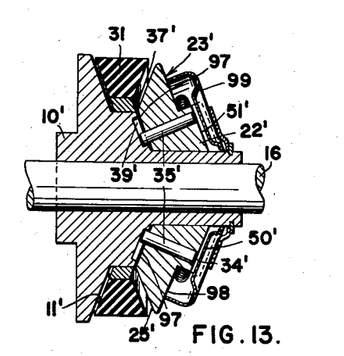
Figs. 13 and 14 are sectional views through an alternative embodiment of the invention showing the centrifugally responsive members in the disengaged and engaged positions respectively.
Figure 14:
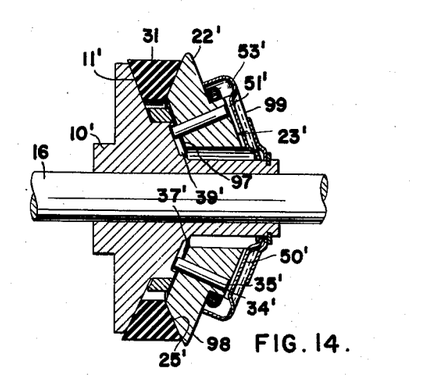

In the embodiment of Figs. 1–5 the centrifugally responsive members 22 move radially to close, or narrow, the V between the half-sheaves 10 and 23, i.e. between frusto-conical belt engaging surface 11 of the unitary disc 10 and the frusto-conical belt engaging surface 25 on the multi-segmented disc 23 formed jointly by the segments 22, and thus engage and compress the belt 31 in the V between the frusto-conical surfaces 11 and 25. In the embodiment of Figs. 1–5 radial movement of centrifugal segments 22 results in displacement of the frusto-conical belt engaging surface 25 on the multi-segmented disc 23 through a distance S in a direction perpendicular to surface 25 and the inclined side of the V-belt 31 to the position shown in dotted lines in Fig. 15a. In the embodiment of Figs. 13 and 14, displacement of the frusto-conical surface 25' on the multi-segmented disc through a substantially greater distance s' in a direction toward belt 31 is obtained for a given radial expansion of the segments than in the embodiment of Figs. 1–5, and consequently the V between the frusto-conical belt engaging surfaces on the half-sheaves is closed, or narrowed, to a much greater degree, the lateral gripping pressure exerted by the centrifugal segments against the V-belt 31 is much greater than in the embodiments of Figs. 1–5, and the horsepower capacity of the embodiment of Figs. 13 and 14 is considerably greater than that of the embodiments of Figs. 1–5. It will be appreciated that the clutch of this embodiment is utilized with a belt-pulley system having fixed centers and having no means for varying the tension of the belt.

Increased relative movement between the opposed frusto-conical belt engaging surfaces is obtained in the embodiment of Figs. 13 and 14 by moving the centrifugally responsive segments in a direction that has both radial and axial components, preferably generally parallel to the frusto-conical belt engaging surface 11' on unitary driving member 10'. Elements of the embodiment of Figs. 13 and 14 similar to those of the embodiments of Figs. 1–5 are given the same reference numerals with the addition of the prime (') designation. The inner face 37' of the unitary disc 10' (which face may be considered a camming surface) is frusto-conical and preferably inclined at the same angle to the axis of rotation as the frusto-conical belt engaging surface 11' on unitary disc 10'. The face 37' has a plurality of peripherally spaced apart, elongated recesses 39' adapted to slidably receive pins 35' in a manner similar to the embodiment of Figs. 1–5. The surface 97 of the multi-segmented disc 23' facing the camming surface 37' on unitary disc 10' is also frusto-conical and preferably at the same angle to the axis of rotation as camming surface 37'. Each centrifugally responsive member 22' is provided with an aperture 34' adapted to receive a pin 35' and having the axis thereof perpendicular to the frusto-conical faces 37' and 97.

The face 98 of the multi-segmented disc 23' away from the unitary disc 10' is also frusto-conical and preferably at the same angle to the axis of rotation as the faces 37' and 97, and each centrifugally responsive segment 22' is provided in the surface away from unitary disc 10' with an elongated groove 51'. A cup-shaped cover 53' has a frusto-conical surface 99 corresponding to the frusto-conical face 98 of the multi-segmented disc 23' and preferably parallel to the frusto-conical camming surface 37'. The cover 53' also has a plurality of peripherally spaced apart, elongated projections 50' on the surface 99 which are slidably received within the elongated grooves 51' to interlock the centrifugally responsive members 22' and prevent their independent movement. In this embodiment the elongated projections 50' and elongated grooves 51' are in planes coincident with the axis of rotation of driving member 10' but not perpendicular thereto, and the word "radial" as used in the appended claims is intended to cover such movement in axial planes even though not perpendicular to the axis.

It will be apparent that, under the influence of centrifugal force, the segments 22', guided, or cammed, by the frusto-conical camming surface 37' on unitary disc 10' and held against camming surface 37 by the frust-conical surface 99 on cover 53' (and while the centrifugal members 22' are being cammed outward and moved circumferentially relative to driving member 10' as the pins 35' slide along the camming surfaces in the elongated recesses 39') move outward at an acute angle to the axis of rotation and in planes coincident with said axis. Preferably this acute angle is the same as that which belt engaging surface 11' makes with the axis of rotation, and preferably the centrifugal members 22' move from the disengaged position shown in Fig. 13, parallel to camming surface 37', to the expanded position shown in Fig. 14 wherein the segments 22' engage the V-belt 31.

The centrifugal segments 22' are moved radially outward and circumferentially due to centrifugal force and the camming surfaces of the recesses 39' acting on the pins 35', while these centrifugal segments 22' are simultaneously being actuated generally parallel to frusto-conical surface 11' and at an angle to the axis of rotation in planes coincident with said axis by the camming surface 37' and cover 53' to close the V between the frusto-conical belt engaging surfaces 11' and 25' on driving member 10' and multi-segmented disc 23' respectively.

Figure 15A:
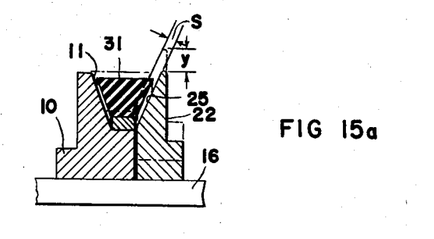
Figs. 15a and 15b are views schematically illustrating that the centrifugally responsive members of the embodiment of Figs. 13 and 14 are moved a considerably greater distance toward the V-belt for a given radial expansion of the centrifugally responsive members than in the embodiment of Figs. 1–5.
Figure 15B:
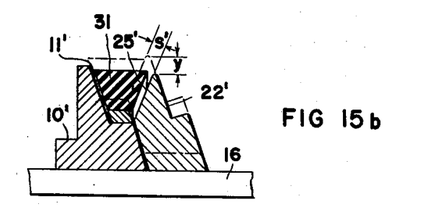
Figure 16:
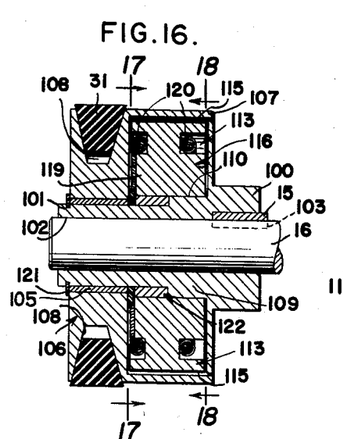
Fig. 16 is a sectional view through the axis of still another embodiment of the invention.

Figs. 15 (a) and (b) illustrate that in the embodiment of Figs. 13 and 14 the frusto-conical belt engaging surfaces 11' and 25' are moved a substantially greater distance s' relative to each other for a given radial expansion y of the centrifugal segments than the distance s which the belt engaging surfaces are moved toward each other in the embodiments of Figs 1–5 for the same radial expansion y of the segments 22. It is schematically represented in Fig. 15(a) that a centrifugally responsive segment 22 of the Figs. 1–5 embodiment shown in disengaged position (in full lines) must move a distance y in the radial direction to effect a displacement of belt engaging surface 25 a distance s toward belt 31 into the engaged position shown in dotted lines. Fig. 15(b) schematically illustrates that in the embodiment of Figs. 13 and 14 wherein the segments 22' are cammed parallel to the frusto-conical surface 11', the belt engaging surface 25' is displaced a substantially greater distance s' toward belt 31' into the engaged position shown in dotted lines for the same radial expansion y of the segments 22'.

It will be appreciated that for a given diameter clutch, the greater relative movement of the belt engaging surfaces 11' and 25' toward each other in the embodiment of Figs. 13 and 14 assures greater compression of the V-belt 31 between the frusto-conical belt engaging surfaces and considerably greater torque and horsepower capacity. Tests show that the torque available from this embodiment of the invention remains at or near maximum despite considerable variation in belt tension.

Figs. 16–20 illustrate an embodiment of the invention wherein the camming surface of the means for drivingly connecting the driving member and each centrifugally responsive member and for moving the centrifugally responsive members centrifugally relative to the driving member assumes a form other than an elongated slot slidably receiving a pin. In this embodiment the camming surface is a flat surface directly on the hub of the driving member, and the centrifugally responsive members are held directly against the flat camming surface. Further, this embodiment of the invention utilizes a different form of means for interlocking the centrifugally responsive members and preventing their independent movement between disengaged and engaged positions.

A driving member 100 having a hub 101 is provided with an axial bore 102 having a keyway slot 103 in the inner periphery thereof adapted to receive a key 15 to permit keying the driving member 100 to a rotatable shaft 16 extending through the axial bore 102 and operatively engage driving member 100 with shaft 16. A bearing 105 circumjacent the hub 101 rotatably journals a driven drum 106 having a rim 107 extending parallel to the axis of shaft 16. In the illustrated embodiment the drum 106 is integral with a sheave 108 adapted to receive and drive a belt 31.

The hub 101 is provided with an enlarged diameter portion 109 having four flat surfaces 110 on the outer circumference thereof spaced ninety degrees apart and each being inclined to the radius intersecting the midpoint thereof, preferably at right angles thereto. Each flat camming surface 110 extends from the radially innermost portion 111 to a portion 112 further removed from the axis of rotation for increasing the pressure with which the centrifugally responsive members 113 engage the rim 107 beyond that resulting from centrifugal force when the drive shaft 16 is rotated in one direction. This radially outermost portion of the camming surface 110 also cooperates with the rim 107 of the driven element to tend to restrain the centrifugal members 113 in their radially outward position. The flat camming surface 110 also extends from radially innermost portion 111 to a portion 112′ further removed from the axis of rotation which cooperates with rim 107 to increase the gripping pressure of the centrifugally responsive members 113 against the rim 107 of driven drum 106 when the drive shaft 16 is rotated in the opposite direction. Four centrifugally responsive members 113 surround the hub 101 and each centrifugally responsive member 113 includes an arcuate rim 114 having a clutching surface 115 on the outer periphery thereof and also includes a radially inward extending body portion 116. The radially innermost face 117 of each centrifugally responsive member 113 is flat and disposed against a flat camming surface 110 on hub 101. On both axial ends of the body portion 116, projections 119 extend parallel to the axis of shaft 16 and in radially spaced relation to the rim 114 to form arcuate grooves on both sides of the body portion, and resilient garter springs 120 within these arcuate grooves between the rim 114 and the axially extending projections 119 normally resiliently retain each centrifugally responsive member 113 in a radially inward position wherein each radially innermost flat face 117 is held against a flat camming surface 110 and the clutching surface 115 is free of the rim 107. A retaining ring 121 within a circumferential groove in the hub 101 beyond the sheave 108 prevents axial movement of the clutch components relative to each other.

Figure 19:
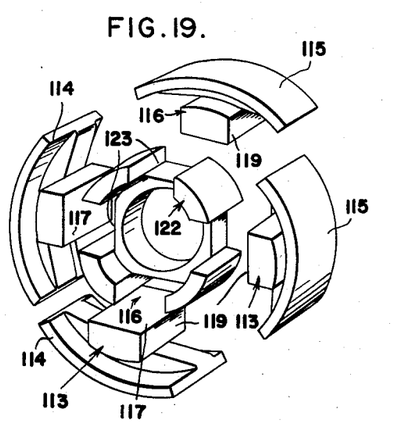
Fig. 19 is a perspective view of the means for interlocking the centrifugally responsive members in the embodiment of Figs. 16–20; and, Fig. 20 is a schematic view illustrating the means for drivingly connecting the driving member and the centrifugally responsive members in the embodiment of Figs. 16–20.
Figure 20:
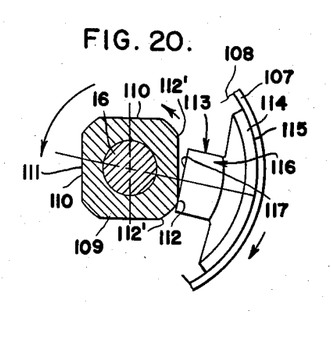

The means for interlocking the centrifugally responsive members 113 and preventing their independent movement includes a spider 112 circumjacent and freely rotatable about the hub 101 between the larger diameter portion 109 and the sheave 108. The spider 122 has four slots 123 spaced ninety degrees apart extending radially inward from the circumference thereof, and each slot 123 is adapted to slidably receive the radially extending body portion 116 of a centrifugally responsive shoe 113.

Figure 17:
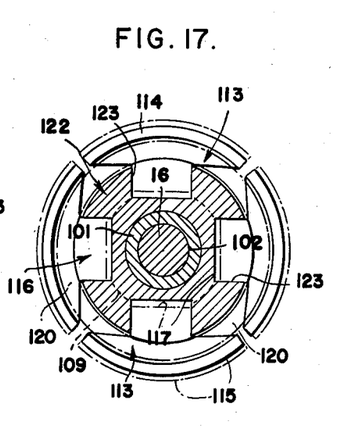
Fig. 17 is a sectional view taken on line 17—17 of Fig. 16.
Figure 18:
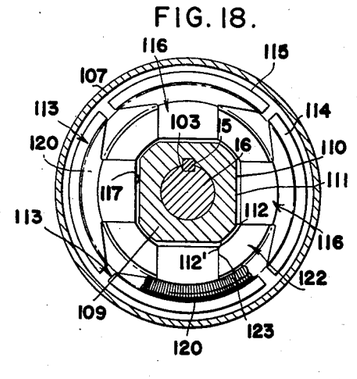
Fig. 18 is a sectional view taken on line 18—18 of Fig. 16.

The centrifugally responsive members 113 are adapted in response to a predetermined rotational velocity of driving shaft 16 to move from a normal disengaged position, as shown in Fig. 18 and in full lines in Fig. 17, to a radially outer position shown in dotted lines in Fig. 17 wherein the clutching surface 115 is in engagement with the inner periphery of rim 107 of drum 106. As the centrifugally responsive members 113 move radially outward, the reaction, or drag, of drum 106 on the centrifugally responsive shoes 113 causes the shoes 113, interlocked by spider 122, to simultaneously rotate counter to the direction of rotation of shaft 16. Inasmuch as the shoes 113 rotate as a unit, the flat follower surface 117 on each centrifugally responsive member 113 slides along a camming surface, e.g., the camming surface between points 111 and 112, to a position shown in Fig. 20 wherein the radially outermost portion 112 of the camming surface holds the centrifugally responsive member 113 firmly against the rim 107 of drum 106. The drag of the driven drum 106 on the centrifugal shoes 113 is in a direction to hold the centrifugally responsive member 113 in this radially outer position wherein radially inward directed forces tending to return the centrifugally responsive members 113 to their radially inward position have a major component perpendicular to the camming surface between points 111 and 112 and have only a minor component along the camming surface. Further the camming surface acts in the manner of, and provides the same mechanical advantages as, an inclined plane and cooperates with the rim 107 to multiply the gripping pressure with which the centrifugally responsive members 113 engage rim 107 beyond that resulting from centrifugal force in a manner similar to that explained hereinbefore for the embodiments of Figs. 1–5. The camming surface between portions 111 and 112 cooperates with rim 107 to provide a toggle action which tends to restrain the centrifugally responsive member 113 in its radially outer position against rim 107 when the drive shaft 16 is rotated in one direction, and the camming surface between portions 111 and 112′ cooperates with rim 107 to provide a toggle action which tends to hold the centrifugally responsive member 113 in its radially outer position when the drive shaft 116 is rotated in the opposite direction.

Although in all of the illustrated embodiments the centrifugally responsive members have been shown as segments jointly forming a multi-segmented disc, the invention is not so limited, and satisfactory clutch operation can be obtained where the centrifugally responsive members have a configuration other than of a segment of a circle and are not contiguous to each other in their radially inward position. Further, other means than a tension spring may be utilized to resiliently urge the centrifugally responsive members to their disengaged position, for example an elastic member.

Although I have shown and described particular embodiments of my invention, it will be obvious to those skilled in the art that many changes and modifications may be made therein without departing from the invention, and I intend in the appended claims to cover all changes and modifications as fall within the true spirit and scope of my invention.

1. A speed responsive clutch comprising, in combination, a rotatable driving member having a frusto-conical belt engaging surface near the outer margin thereof, a plurality of centrifugally responsive members jointly forming a multi-segmented disc having a frusto-conical belt engaging surface opposite said frusto-conical surface on said driving member, resilient means normally retaining said centrifugally responsive members in a radially inward position wherein said frusto-conical surface on said multi-segmented disc is free of a belt disposed between said frusto-conical surfaces on said driving member and said multi-segmented disc, said centrifugally responsive members being adapted in response to a predetermined rotational velocity to move to a radially outward position wherein said belt is engaged between said frusto-conical surfaces on said driving member and said multi-segmented disc, a plurality of means for drivingly connecting said driving member and each said centrifugally responsive member and for moving said centrifugally responsive members circumferentially relative to said driving member as they move between said radially inward and radially outward positions, means including a frusto-conical camming surface on said driving member for camming said centrifugally responsive members axially of said driving member and at an acute angle to the axis of rotation of said driving member as said centrifugally responsive members move between said radially inward and radially outward positions, a rotatable interlocking member, and interengaging means between said interlocking member and each said centrifugally responsive member permitting movement of said centrifugally responsive member, relative to said interlocking member, only in a plane coincident with the axis of rotation of said driving member.

2. A speed responsive clutch comprising, in combination, a rotatable driving member having a frusto-control belt engaging surface near the outer margin thereof, a plurality of centrifugally responsive members jointly forming a multi-segmented disc having a frusto-conical belt engaging surface opposite said frusto-conical surface on said driving member, a plurality of means for drivingly connecting said driving member and each said centrifugally responsive member, resilient means normally retaining said centrifugally responsive members in a radially inward position wherein said frusto-conical surface on said multi-segmented disc is free of a belt disposed between said frusto-conical surfaces on said driving member and said multi-segmented disc, said centrifugally responsive members being adapted in response to a predetermined rotational velocity to move to a radially outward position wherein said belt is engaged between said frusto-conical belt engaging surfaces on said driving member and said multi-segmented disc, means including a frusto-conical camming surface on said driving member radially inward from and generally parallel to said belt engaging surface on said driving member for camming said centrifugally responsive members in a direction generally parallel to said belt engaging surface on said driving member as said centrifugally responsive members move between said radially inward and radially outward positions, a rotatable interlocking member, and interengaging means between said interlocking member and each said centrifugally responsive member permitting movement of said centrifugally responsive member, relative to said interlocking member, only in a plane coincident with the axis of rotation of said driving member.

3. A speed responsive clutch comprising, in combination, a rotatable driving member having a frusto-conical belt engaging surface near the outer margin thereof, a plurality of centrifugally responsive members jointly forming a multisegmented disc having a frusto-conical belt engaging surface opposite said frusto-conical surface on said driving member, a plurality of means for drivingly connecting said driving member and said centrifugally responsive members, resilient means normally retaining said centrifugally responsive members in a radially inward position wherein said frusto-conical surface on said multi-segmented disc is free of a belt disposed between said frusto-conical surfaces on said driving member and said multi-segmented disc, said centrifugally responsive members being adapted in response to a predetermined rotational velocity of said driving member to move to a radially outward position wherein said belt is engaged between said frusto-conical belt engaging surfaces on said driving member and said multi-segmented disc, and means for camming said centrifugally responsive members in a direction generally parallel to the frusto-conical surface on said driving member as said centrifugally responsive members move between said radially inward and radially outward positions.

4. A speed responsive clutch comprising, in combination, a rotatable driving member having a frusto-conical belt engaging surface near the outer margin thereof and a frusto-conical camming surface radially inward from and generally parallel to said belt engaging surface, a plurality of centrifugally responsivee members jointly forming a multi-segmented disc having near the outer margin thereof a frusto-conical belt engaging surface opposite the belt engaging surface on said driving member but inclined to the axis of rotation of said driving member at an angle approximately equal but opposite to that at which the belt engaging surface on said driving member is inclined to said axis and also having a frusto-conical surface radially inward from said belt engaging surface opposite and generally parallel to said camming surface on said driving member, a plurality of means for drivingly connecting said driving member and said centrifugally responsive members, resilient means normally retaining said centrifugally responsive members in a radially inward position wherein said frusto-conical surface on said multi-segmented disc is free of a belt disposed between said frusto-conical belt engaging surfaces on said driving member and said multi-segmented disc, said centrifugally responsive members being adapted in responsive to a predetermined rotational velocity to move to a radially outward position wherein said belt is engaged between said frusto-conical belt engaging surfaces on said driving member and said multi-segmented disc, and means for urging said centrifugally responsive members against said camming surface on said driving member as said centrifugally responsive members move between move between said radially inward and radially outward positions.

5. A speed responsive clutch comprising, in combination, a rotatable driving member having a frusto-conical belt engaging surface near the outer margin thereof and a frusto-conical camming surface radially inward from and generally parallel to said belt engaging surface and also having an axially bored hub, a plurality of centrifugally responsive members jointly forming a multi-segmented disc circumjacent said hub having a frusto-conical surface opposite and generally parallel to said camming surface on said driving member and also having near the outer margin thereof a frusto-conical belt engaging surface opposite the belt engaging surface on said driving member but inclined to the axis of said hub at an approximately equal but opposite angle to that at which said belt engaging surface on said driving member is inclined to said axis, a plurality of means for drivingly connecting said driving member and each of said centrifugally responsive members, resilient means for normally retaining said centrifugally responsive members in a radially inward position wherein said belt engaging surface on said multi-segmented disc is free of a belt disposed between said belt engaging surfaces on said driving member and said multi-segmented disc, said centrifugally responsive members being adapted in response to a predetermined rotational velocity to move to a radially outward position wherein said belt is engaged between said frusto-conical belt engaging surfaces on said driving member and said multi-segmented disc, a cover circumjacent said hub having a frusto-conical surface generally parallel to said camming surface on said driving member and disposed against the side of said multi-segmented disc away from said driving member, and means engaging said hub on the side of said cover away from said multi-segmented disc for preventing axial movement of said cover relative to said multi-segmented disc, said frusto-conical surface on said cover urging said centrifugally responsive members against said camming surface as said centrifugally responsive members move between radially inward and radially outward positions.

6. A speed responsive clutch comprising, in combination, a rotatable driving member having a frusto-conical belt engaging surface near the outer margin thereof and a camming surface radially inward from said belt engaging surface, a plurality of centrifugally responsive members jointly forming a multi-segmented disc having near the outer margin thereof a frusto-conical belt engaging surface opposite the belt engaging surface on said driving member but inclined to the axis of said driving member at an angle approximately equal but opposite to that at which said belt engaging surface on said driving member is inclined to said axis, a cover circumjacent said hub having a surface engaging the side of said multi-segmented disc away from said driving member, means engaging said hub on the side of said cover away from said multi-segmented disc for preventing axial movement of said cover relative to said disc, said camming surface, said surface on said cover, and the surfaces on said multi-segmented disc opposite said camming surface and opposite said cover all being frusto-conical and generally parallel to the belt engaging surface on said driving member, resilient means for normally retaining said centrifugally responsive members in a radially inward position wherein said multi-segmented disc is free of a belt disposed between said belt-engaging surfaces on said driving member and said multi-segmented disc, said centrifugal responsive members being adapted in response to a predetermined rotational velocity to move to a radially outward position wherein said belt is engaged between said frusto-conical belt engaging surfaces on said driving member and said multi-segmented disc, said frusto-conical surface on said cover being adapted to urge said centrifugally responsive members against said camming surface to move said centrifugally responsive members at an acute angle to said axis of rotation of said driving member as said centrifugally responsive members move between said radially inward and radially outward positions.

7. A speed responsive clutch comprising, in combination, a rotatable driving member having a frusto-conical belt engaging surface near the outer margin thereof, a plurality of centrifugally responsive members jointly forming a multi-segmented disc having a frusto-conical belt engaging surface opposite said frusto-conical surface on said driving member, a plurality of means for drivingly connecting said driving member and said centrifugally responsive members, resilient means normally retaining said centrifugally responsive members in a radially inward position wherein said frusto-conical surface on said multi-segmented disc is free of a belt disposed between said frusto-conical surfaces on said driving member and said multi-segmented disc, said centrifugally responsive members being adapted in response to a predetermined rotational velocity of said driving member to move to a radially outward position wherein said belt is engaged between said frusto-conical belt engaging surfaces on said driving member and said multi-segmented disc, and means including a frusto-conical camming surface on said driving member for camming said centrifugally responsive members axially of said driving member and at an acute angle to the axis of rotation of said driving member as said centrifugally responsive members move between said radially inward and radially outward positions.

References Cited in the file of this patent

UNITED STATES PATENTS

| | | |
|---|---|---|
| 2,235,107 | Kreis | Mar. 18, 1941 |
| 2,623,400 | Davis | Dec. 30, 1952 |
| 2,762,483 | Clark | Sept. 11, 1956 |

FOREIGN PATENTS

| | | |
|---|---|---|
| 32,008 | France | Mar. 22, 1927 |
| | (2nd addition to No. 559,845) | |
| 688,351 | Great Britain | Mar. 4, 1953 |